US011757836B2

United States Patent
Whittle et al.

(10) Patent No.: US 11,757,836 B2
(45) Date of Patent: Sep. 12, 2023

(54) MANAGEMENT OF INTERNET OF THINGS (IOT) BY SECURITY FABRIC

(71) Applicants: John Lunsford Gregory Whittle, Menlo Park, CA (US); Jonathan Q. Nguyen-Duy, Fairfax, VA (US); Michael Craig Woolfe, Ashburn, VA (US)

(72) Inventors: John Lunsford Gregory Whittle, Menlo Park, CA (US); Jonathan Q. Nguyen-Duy, Fairfax, VA (US); Michael Craig Woolfe, Ashburn, VA (US)

(73) Assignee: Fortinet, Inc., Sunnyvale, CA (US)

( * ) Notice: Subject to any disclaimer, the term of this patent is extended or adjusted under 35 U.S.C. 154(b) by 238 days.

(21) Appl. No.: 17/199,571

(22) Filed: Mar. 12, 2021

(65) Prior Publication Data
US 2021/0288939 A1 Sep. 16, 2021

Related U.S. Application Data

(63) Continuation of application No. 15/396,423, filed on Dec. 31, 2016, now Pat. No. 11,057,345, which is a
(Continued)

(51) Int. Cl.
*H04L 9/40* (2022.01)
*H04L 67/02* (2022.01)
(Continued)

(52) U.S. Cl.
CPC ......... *H04L 63/0227* (2013.01); *H04L 49/25* (2013.01); *H04L 63/105* (2013.01); *H04L 63/1408* (2013.01); *H04L 63/1416* (2013.01); *H04L 63/1425* (2013.01); *H04L 63/205* (2013.01); *H04L 67/01* (2022.05); *H04L 67/02* (2013.01); *H04L 67/10* (2013.01); *H04L 67/12* (2013.01); *H04L 67/303* (2013.01); *H04L 63/0272* (2013.01); *H04L 63/1458* (2013.01)

(58) Field of Classification Search
USPC .......................................................... 726/1
See application file for complete search history.

(56) References Cited

U.S. PATENT DOCUMENTS 9,426,178 B1  8/2016 Yanovsky
9,967,279 B2  5/2018 Chesla
(Continued)

*Primary Examiner* — Sakinah White Taylor
(74) *Attorney, Agent, or Firm* — Law Office of Dorian Cartwright; Dorian Cartwright

(57) ABSTRACT

The present invention relates to a method for managing IoT devices by a security fabric. A method is provided for managing IoT devices comprises collecting, by analyzing tier, data of Internet of Things (IoT) devices from a plurality of data sources, abstracting, by analyzing tier, profiled element baselines (PEBs) of IoT devices from the data, wherein each PEB includes characteristics of IoT devices; retrieving, by executing tier, the PEBs from the analyzing tier, wherein the executing tier is configured to control network traffic of IoT devices of a private network; generating, by the executing tier, security policies for IoT devices from PEBs of the IoT devices; and controlling, by the executing tier, network traffic of the IoT devices of the private network to comply with the security policies.

20 Claims, 6 Drawing Sheets

Related U.S. Application Data continuation of application No. 15/396,378, filed on Dec. 30, 2016, now Pat. No. 11,057,344.

(51) Int. Cl.
*H04L 67/12* (2022.01)
*H04L 67/01* (2022.01)
*H04L 67/10* (2022.01)
*H04L 67/303* (2022.01)
*H04L 49/25* (2022.01)

(56) References Cited

U.S. PATENT DOCUMENTS

| | | |
|---|---|---|
| 10,374,971 B2 | 8/2019 | Parikh |
| 10,404,569 B2 * | 9/2019 | Hershey ............... H04L 43/067 |
| 10,419,931 B1 * | 9/2019 | Sohail ................ H04L 63/1425 |
| 10,673,880 B1 * | 6/2020 | Pratt .................... G06F 21/554 |
| 2014/0359131 A1 | 12/2014 | Seed |
| 2015/0163121 A1 | 6/2015 | Mahaffey |
| 2015/0195146 A1 | 7/2015 | Pietro |
| 2015/0249672 A1 | 9/2015 | Burns |
| 2016/0014078 A1 | 1/2016 | Schrecker |
| 2016/0195864 A1 | 7/2016 | Kim |
| 2016/0337206 A1 | 11/2016 | Bugenhagen |
| 2017/0006135 A1 | 1/2017 | Siebel |
| 2017/0171607 A1 * | 6/2017 | Britt ....................... H04W 4/80 |
| 2017/0180380 A1 | 6/2017 | Bagasra |
| 2017/0195136 A1 | 7/2017 | Ghosh |
| 2017/0195318 A1 | 7/2017 | Liu |
| 2018/0006913 A1 | 1/2018 | Asenjo |
| 2018/0131578 A1 | 5/2018 | Cui |
| 2018/0302907 A1 | 10/2018 | Niina |
| 2020/0154448 A1 | 5/2020 | Wilmunder |
| 2020/0162503 A1 * | 5/2020 | Shurtleff ............ H04L 41/0883 |

* cited by examiner

MANAGEMENT OF INTERNET OF THINGS (IOT) BY SECURITY FABRIC

CROSS-REFERENCE TO RELATED APPLICATIONS

This application claims priority as a continuation of U.S. application Ser. No. 15/396,423 filed on Dec. 31, 2016, which is application is a continuation of U.S. application Ser. No. 15/396,378 filed on Dec. 30, 2016, the contents of both being incorporated herein by reference in their entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to the field of network security techniques. In particular, various embodiments relate to managing IoT devices and other network devices by network security appliances.

Description of the Related Art

The Internet of Things (IoT) is objects, not just computers and computer networks, can be readable, recognizable, locatable, addressable, and controllable via a network, such as a wireless network or the Internet. As IoT technologies may increase business productivities and make everyday life more convenient, billions of IoT devices are being deployed and connected to private networks, public networks and the Internet. Usually, network security appliances, such as firewalls, are deployed at networks to protect them from outside attacks or intrusions. The security appliances may be driven by security policies that are defined according to users, services, types of devices or groups/combination thereof. However, with new types of IoT devices and services are constantly being developed and deployed, security policies for IoT devices may become very complicated and it is very hard for network administrators to create appropriate network security policies for all the IoT devices. If IoT devices of a corporate network cannot be properly protected, compromised IoT devices can be back doors to a person or the corporate network or be slaved as zombies during Distributed Denial of Service (DDoS) attack.

Therefore, there is a need for a security fabric that can generate security models for IoT devices and share the models among members of the security fabric in order that IoT devices of the members may be properly managed based on the shared models. There is also a need for a network security fabric that can create a whole view of a network with IoT devices and coordinate the management of IoT devices at multiple tiers.

SUMMARY

The present invention relates to a method for managing IoT devices by a security fabric. According to one embodiment, a method for managing IoT devices comprises collecting, by an analyzing tier of a network security system, data of Internet of Things (IoT) devices from a plurality of data sources (e.g., a log management system), abstracting, by the analyzing tier of the network security system, profiled element baselines (PEBs) of IoT devices from the data, wherein each of the PEBs includes characteristics of an IoT device; retrieving, by an executing tier of the network security system, the PEBs from the analyzing tier of the network security system, wherein the executing tier of the network security system is configured to control network traffic of one or more IoT devices of a private network; generating, by the executing tier of the network security system, one or more security policies for one or more IoT devices from the PEBs of the one or more IoT devices; and controlling, by the executing tier of the network security system, network traffic of the one or more IoT devices of the private network to comply with the one or more security policies.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
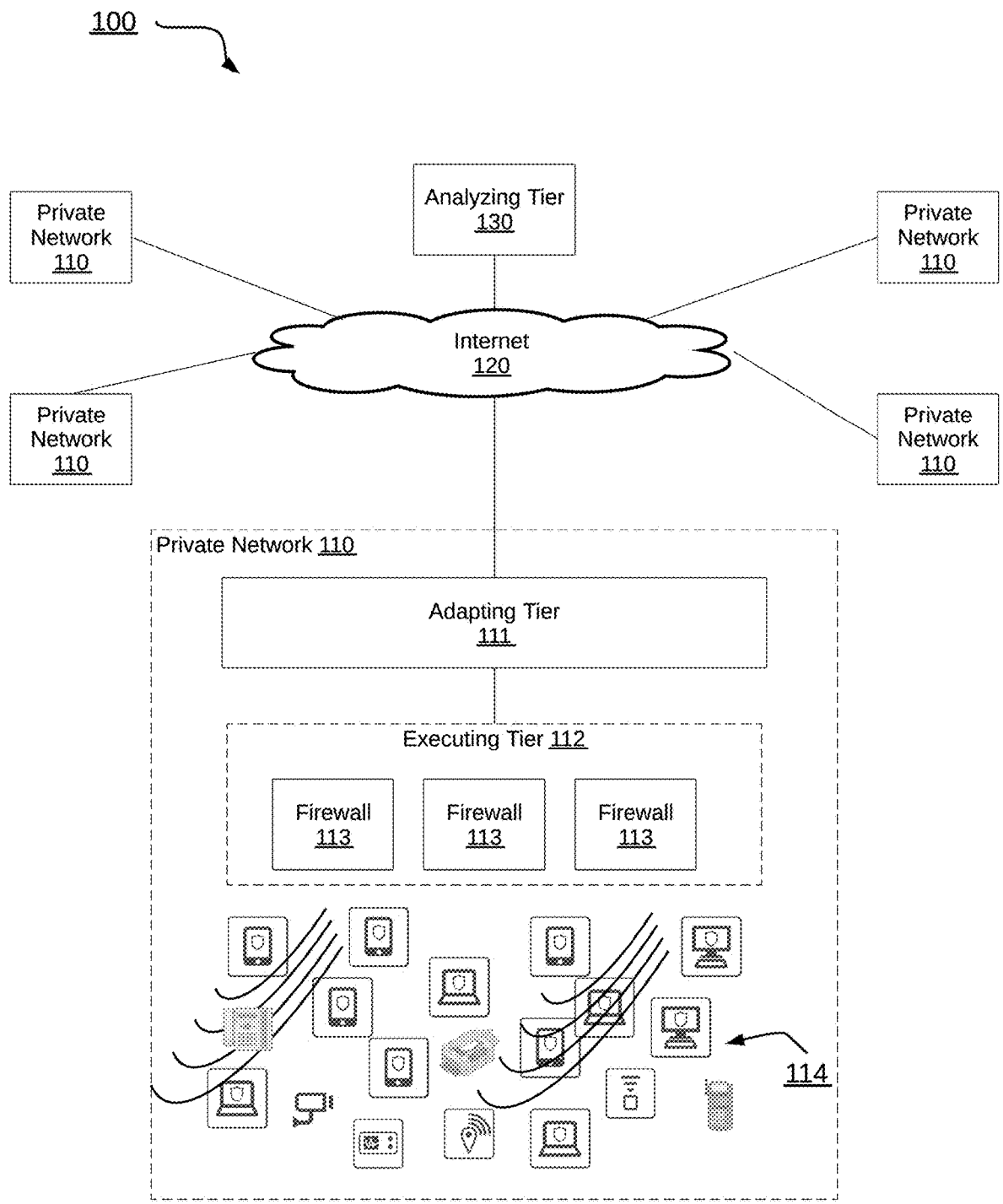
FIG. 1 illustrates exemplary network architecture in accordance with an embodiment of the present invention.

The present invention relates to a method for managing IoT devices by a security fabric. According to one embodiment, a method for managing IoT devices comprise collecting, by an analyzing tier of a network security system, data of Internet of Things (IoT) devices from a plurality of data sources, abstracting, by the analyzing tier of the network security system, profiled element baselines (PEBs) of IoT devices from the data, wherein each of the PEBs includes characteristics of an IoT device; retrieving, by an executing tier of the network security system, the PEBs from the analyzing tier of the network security system, wherein the executing tier of the network security system is configured to control network traffic of one or more IoT devices of a private network; generating, by the executing tier of the network security system, one or more security policies for one or more IoT devices from the PEBs of the one or more IoT devices; and controlling, by the executing tier of the network security system, network traffic of the one or more IoT devices of the private network to comply with the one or more security policies.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, application control, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

I. Systems for Security Fabric Managing IoT Devices

FIG. 1 illustrates exemplary network architecture 100 with a security fabric managing IoT devices in accordance with an embodiment of the present invention. Network architecture 100 includes multiple private networks 110 that are connected by a public network, such as the Internet 120. Each private network 110 may have with the same or similar network structure. In the present invention, a security fabric is a network security system that integrates discrete security solutions to provide security services to one or more private networks and coordinates the services and operations at different tiers of the security fabric. A security fabric may comprise three tiers of services and appliances, i.e. an analyzing tier, an adapting tier and an executing tier, that can be deployed at different location of network architecture 100.

In the present example, executing tier 112 may be used for separating the internal of private network 110 from the external computing environment, such as the Internet 120. Executing tier 112 may include one or more security appliances, such as firewalls 113, which are configured with network security policies for controlling network traffic between internal devices 114 and the Internet 120. The security appliances include FortiGate and FortiWiFi from the assignee of the present invention or other policy-based network security products from other manufacturers. The internal devices may include conventional network devices, such as end user computers, application servers and peripheral devices as well as IoT devices. In the present invention, IoT devices may be simple objects embedded with electronics, sensors or actuators that can collect environment data and provide the data through wired or wireless network connectivity. For example, a smart sensor can be mounted in a house to monitor temperature, humidity, light, smoke and etc. Data detected by the smart sensor may be transmitted to a user computer or smart phone through the Internet and the user may remote control the smart sensor or home appliances over the Internet. IoT devices may be complex objects that are equipped with multiple simple IoT devices and can provide services to other devices or access remote services provided by other service providers. The complex IoT objects may be self-driving cars, smart buildings or intelligent factories. When IoT devices communicate with other devices, network traffic of IoT devices are intercepted, logged or sampled for forensic analysis or further evaluation by executing tier 112. Executing tier 112 may also collect software and hardware configuration information of IoT devices or other internal devices through neighbor discovery protocols, such as Link Layer Discovery Protocol (LLDP). Configuration information of internal devices collected by executing tier 112 may include, but not limited to, host names, IP addresses, MAC addresses, types of device, serial numbers, model types, types of service available, physical layer capabilities, and enhanced locations.

In another example, client security management software, such as FortiClient from the assignee of the present invention, may be installed on a client machine of private network 110 to collect detailed network traffic logs and system logs of the client machine.

The local network information, including traffic logs and hardware/software configurations of IoT devices, collected by executing tier 112 may be submitted to adapting tier 111 or analyzing tier 130 for generating profiled element baselines (PEBs) or modified PEBs. This will be described in detail later.

Adapting tier 111 is used for gathering local network information collected by executing tier 112 or other local data sources to establish a whole view of private network 110. Adapting tier 111 may include one or more security information and event management (STEM), inventory servers, network security management or network security analysis appliances, such as FortiSIEM, FortiManager or FortiAnalyzer from the assignee of the present invention. Local network information, including network traffic logs, system logs and device configuration/environment information, collected from local data sources may be analyzed at adapting tier 111 to establish a whole view of the configurations and operations across private network 110. Adapting tier 111 may discover malicious operations that cannot be found by individual network security appliance at executing tier 112 by correlating network traffic logs collected by multiple network security appliances of executing tier 112 and create corresponding security policies to mitigate the malicious operations for executing tier 112. SIEM system operations are well known to those skilled in the art and further description thereof is omitted. In the present example, local network information collected by adapting tier 111 may be submitted to analyzing tier 130 for further analyzing and creating PEBs for IoT devices or other network devices. Adapting tier 111 may also be used for generating customized local operation models for different kinds of IoT devices based on the local network information, which will be described in detail later.

Analyzing tier 130 is used for collecting network information from multiple private networks 110, individual network devices, IoT device manufacturers or public available sources and generating PEBs for IoT devices and other network devices based on the information collected across the Internet 120. Analyzing tier 130 may be a cloud-based network security service provider, such as FortiGuard or FortiCloud from the assignee of the present invention, which can be accessed by subscribers. In one example, analyzing tier 130 may receive network traffic logs, data packet samples and configuration information of internal IoT devices and other network devices directly from network security appliances at executing tier 112 of private network 110. In this scenario, each of the network security appliances of executing tier 112 may subscribe services from analyzing tier 130 and submit network traffic logs and network configuration information of IoT devices to analyzing tier 130 through a secure tunnel. In another example, adapting tier 111 may gather network traffic and configuration information collected from executing tier 112 of private network 110 and then submits the information to analyzing tier 130.

In the present invention, analyzing tier 130 gathers network traffic logs, data packet samples, data packet headers and configuration information of network devices, especially IoT devices, that are used by multiple private networks 110. Analyzing tier 130 may identify different types of IoT devices from the configuration information collected from the subscribers. IoT devices may be categorized into multiple classes based on its functionalities and each class may be further categorized into sub-classes if it is necessary. Each class or sub-class may comprise multiple generic types of IoT devices, for example, the smart sensor class may include heating sensor, lighting sensor, location sensor, positioning sensor, pressure sensor, motion sensor, surveillance camera and etc. The smart device class may include smart phone, unmanned vehicle, drone, automatic machinery and etc. Complex appliance class may include smart office, smart house, smart buildings and etc. Network traffic samples and configuration information of each type of IoT device may be extracted from network traffic logs collected by analyzing tier 130 and a PEB of each type of IoT device may be abstracted from the network traffic samples using statistics, pattern recognition, machine learning or other related technologies. A PEB may include generic configuration and network traffic characteristics of an IoT device. For example, a PEB may include hardware and software configuration of the IoT device, such as CPU, memory, interfaces, firmware, operating system, manufacturer, certificates, authentications, services that the IoT device will access and applications that are used for controlling the IoT device. The PEB may include network characteristics of the IoT device, such as the protocols used at physical/link/network/application layer of OSI network model, port numbers used by the IoT device, typical data packet header or IP header of data packet of the IoT device. The PEB may also include network activity characteristics, such as the typical bandwidth consumed by the IoT device, the network traffic patterns of the IoT device over time.

A PEB of a complex appliance may include PEBs of IoT devices that are mounted on the complex appliance as well as other unique network configuration and network traffic characteristics of the complex appliance. The PEB may also include network security operations that are generally conducted to the IoT device by network security appliances, including, but not limited to network firewalling, virtual private network, antivirus, intrusion prevention (IPS), content filtering, data leak prevention, antispam, antispyware, logging, reputation-based protections, event correlation, network access control, vulnerability management, load balancing, traffic shaping, application detection, traffic compression/decompression, and traffic encryption/decryption.

Analyzing tier 130 may further classify operations in a PEB of an IoT device into a rigid class and a discretionary class, wherein the operations of rigid class are mandatory to be implemented at lower tiers and the operations of discretionary class are optional or adaptive at adapting tier or executing tier of the network security system.

In another example, a PEB or parts of the PEB of an IoT device may be created by the manufacturer of the IoT device based on its hardware and software configurations. Analyzing tier 130 may collect PEBs from IoT device manufacturers.

Analyzing tier 130 may store the PEBs at its database. Analyzing tier 130 may also periodically update PEBs of IoT devices based on new information collected from other tiers of the security fabric.

The PEBs created by analyzing tier 130 may be transferred to other tiers of the security fabric to manage securities of IoT devices in accordance with the PEBs. A SIEM device at adapting tier 111 of private network 110 may retrieve PEBs of IoT devices from analyzing tier 130. The PEBs of IoT devices retrieved from analyzing tier 130 may be tailored by adapting tier 111 based on local network security policies of private network 110. For example, an IoT device, such as a smart socket supports remote access through HTTP and HTTPS. Adapting tier 111 may disable the unsafe HTTP access by removing the HTTP access from the PEB and create an adapted PEB of the smart socket of private network 110. In another example, the bandwidth usage defined in a PEB of an IoT device may be reduced by adapting tier 111 based on local policies. The adapted PEBs of IoT devices created based on PEBs may be transferred from adapting tier 111 to executing tier 112 for executing. It is understandable that adapting tier 111 may be optional and the PEBs of IoT devices may be retrieved directly by network security appliances of executing tier 112.

Network security appliances of executing tier 112 may retrieve PEBs or adapted PEBs of IoT devices from upper tiers. Network security appliances of executing tier 112 may interpret the PEBs and create local network security policies in accordance with the baselines. For example, the communication protocols, port numbers, bandwidth, services, applications defined in the PEBs or adapted PEBs of an IoT device may be allowed and other network traffic may be blocked by executing tier 112. Security policies corresponding to the security operations defined in the PEBs may also be created by the network security appliances in order that actions, such as allow, block, log, virus scanning, data leak prevention or deep inspection may be taken to network traffic of the IoT devices.

The combination of analyzing tier, adapting tier and executing tier forms security fabric that can accommodate the variations of IoT devices and can manage the securities of IoT devices in a flexible way when the IoT devices is connected to local networks. In the present invention, when a new IoT device is discovered by an inventory server or a firewall, the PEB of the IoT device is retrieved from the analyzing tier of the security fabric and network security policies of the IoT device may be created automatically at the executing tier. The network traffic and activities of the IoT device is then controlled at the executing tier with proper security policies. The administrators of the private network do not need to manually configure network security policies for each of IoT devices of the private network.

Figure 2:
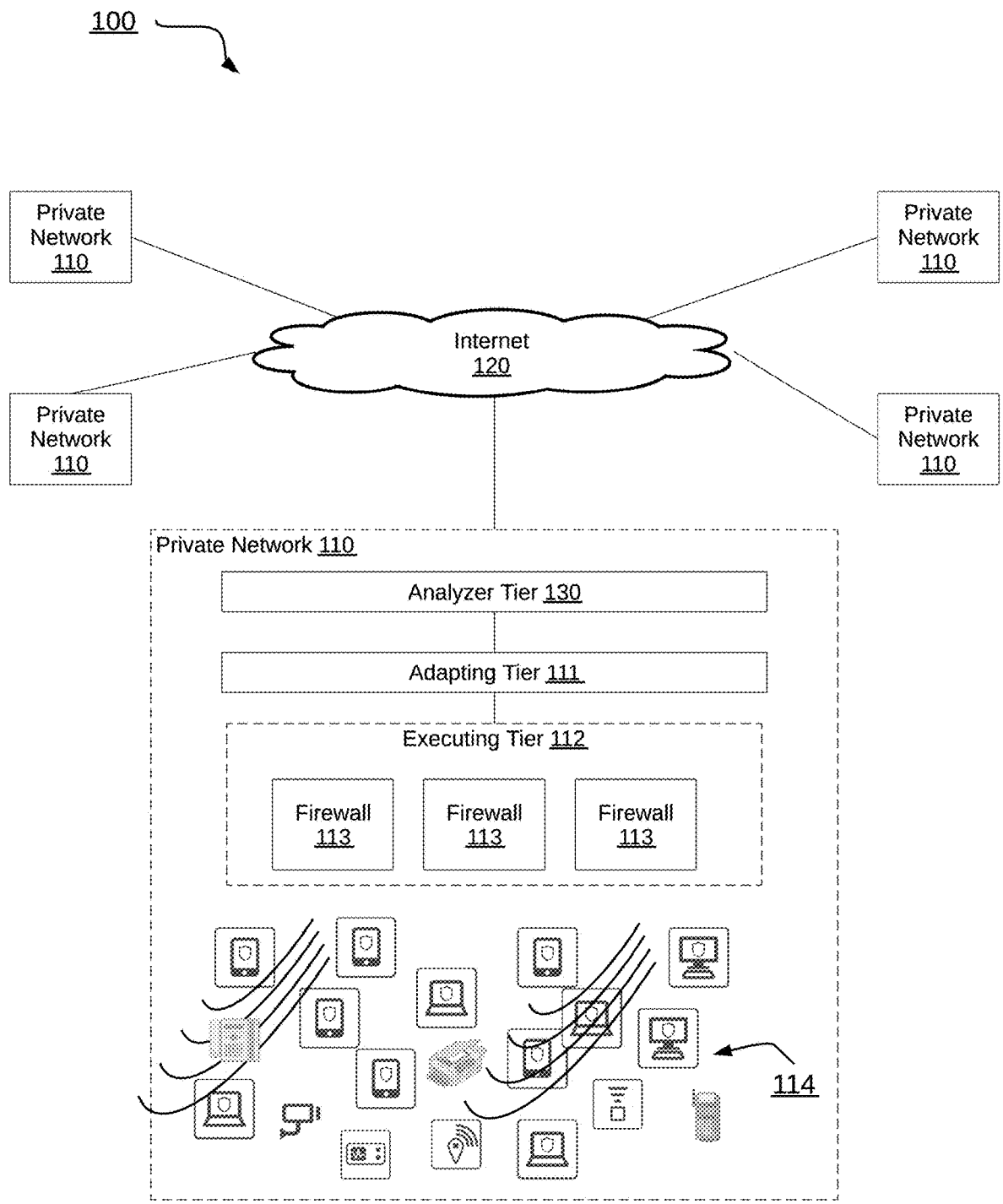
FIG. 2 illustrates exemplary network architecture in accordance with another embodiment of the present invention.

FIG. 2 illustrates exemplary network architecture in accordance with another embodiment of the present invention. Network architecture 100 of FIG. 2 is the same as network architecture 100 of FIG. 1 except the location of analyzing tier 130. Analyzing tier 130 of FIG. 2 is located at a private cloud and provides services only to private network 110. Analyzing tier 130 of FIG. 2 may analyze network traffic and configuration information of private network 110 to create PEBs of IoT devices based on local network information.

Figure 3:
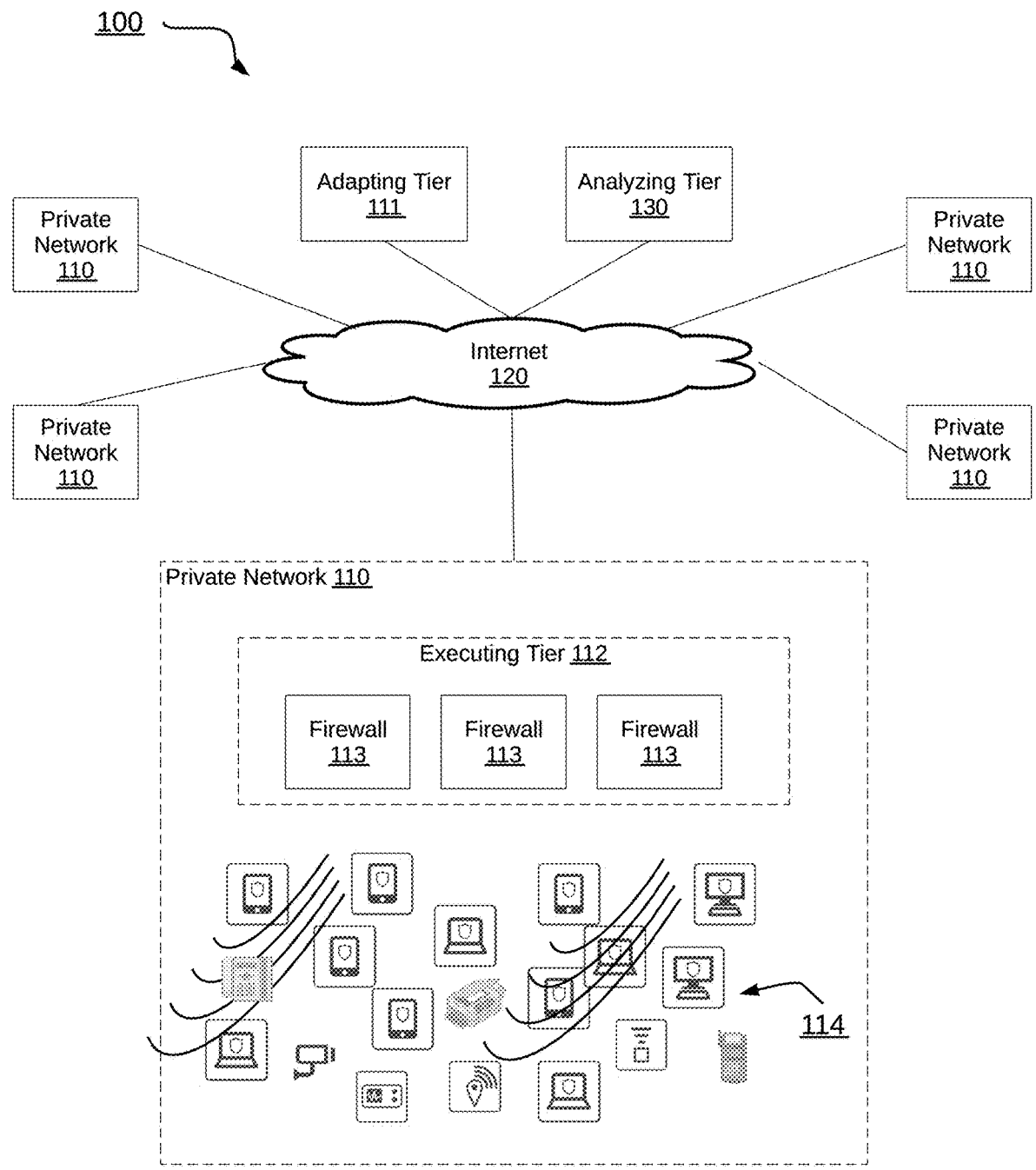
FIG. 3 illustrates exemplary network architecture in accordance with a further embodiment of the present invention.

FIG. 3 illustrates exemplary network architecture in accordance with a further embodiment of the present invention. Network architecture 100 of FIG. 3 is the same as network 110 of FIG. 1 except the location of adapting tier 111. Adapting tier 111 of FIG. 3 is located at a public cloud and provides services to subscribers from multiple private networks 110. Adapting tier 111 of FIG. 3 may collect local network traffic and configuration information of multiple private networks 110 and create modified PEBs of IoT devices to accommodate each of the private networks 110. In another example, the services of analyzing tier 130 and adapting tier 111 may be combined and provided by a single network security service provider, such as FortiGuard or FortiCloud from the assignee of the present invention.

II. Methods for Security Fabric Managing IoT Devices

Figure 4:
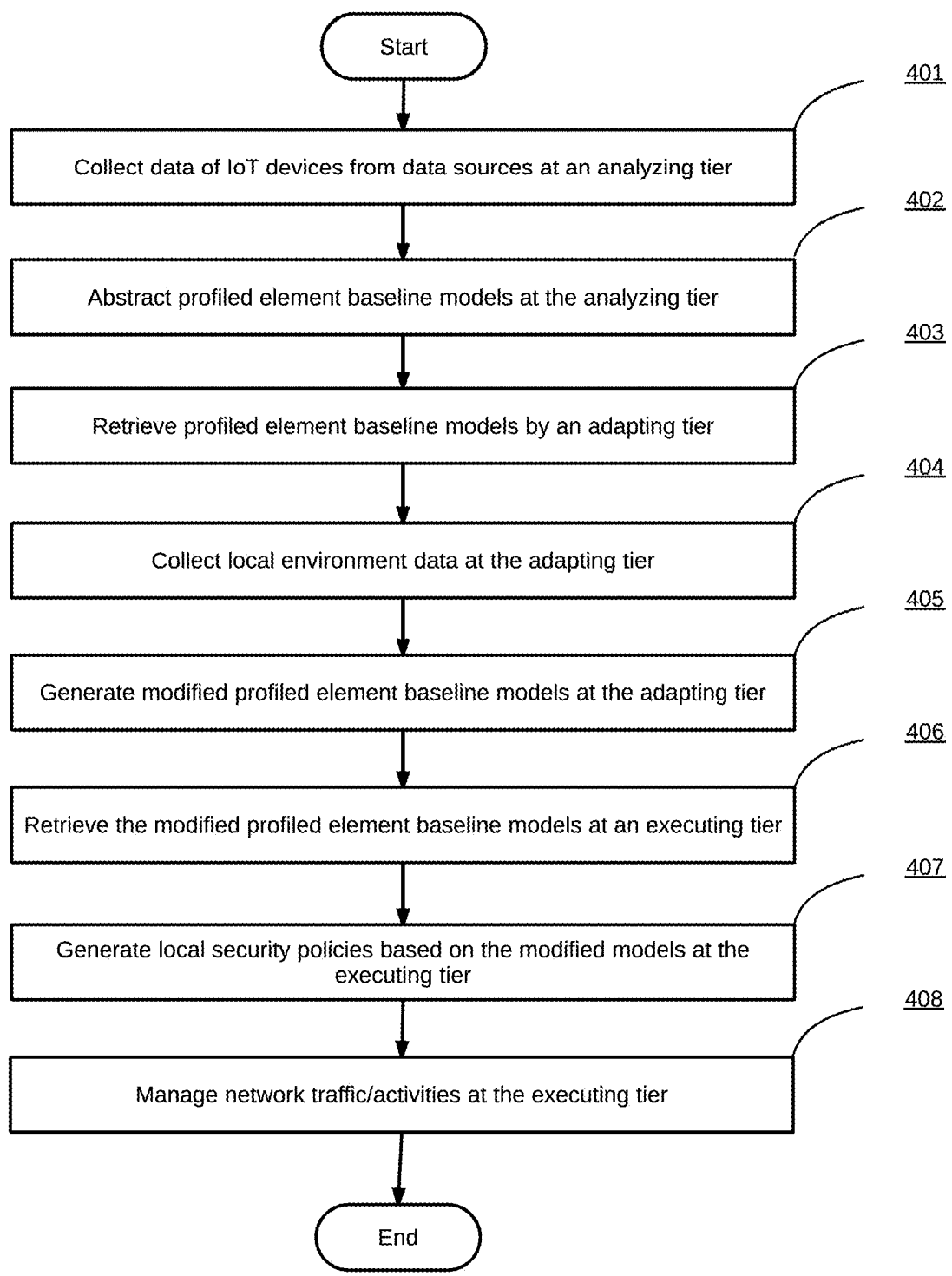
FIG. 4 is a flow diagram illustrating a method for managing IoT devices by a security fabric with multiple tiers of services in accordance with an embodiment of the present invention.

FIG. 4 is a flow diagram illustrating a method for managing IoT devices by a security fabric with multiple tiers of services in accordance with an embodiment of the present invention. In the present example, the security fabric comprises an analyzing tier, an adapting tier and an executing tier that coordinate in management of IoT devices and other network devices of one or more private network.

At block 401, an analyzing tier of a security fabric collects information of IoT devices and other network devices from multiple data sources over a network, such as the Internet. The analyzing tier may be a public cloud-based network security service that can be accessed by multiple subscribers over the Internet or a private cloud-based network security appliance that can be accessed by users of a private network. The data sources that submit information of IoT devices to the analyzing tier may include the adapting tier and the executing tier of the security fabric as well as service subscribers of the security fabric and IoT device manufacturers. The analyzing tier may also retrieve IoT device information from any public available data sources. As the adapting tier and the executing tier are network security appliances or security information and event management systems that are deployed at borders or inside private networks, IoT device information may be intercepted or collected by the adapting tier and the executing tier. The information about IoT devices may include network traffic logs, data packet samples, packet header samples and hardware/software configuration information of IoT devices.

At block 402, the analyzing tier may abstract PEBs of IoT devices and other network devices from information collected from the data sources. By statistical analysis, pattern recognition, machine learning or other relevant techniques, a PEB that include hardware and software configuration characteristics and network activity characteristics of an IoT device may be abstracted from network traffic logs, data packet samples, configurations of a large m number of individual IoT devices of the same type. The PEBs may be created at different granularities. For example, a PEB of a generic IoT device, such as smart heating sensor, may be created by the analyzing tier for any smart heating sensors. In another example, a PEB for a heating sensor from a particular manufacturer may be created. Each PEB may include scripts of characteristics of an IoT device and the scripts may be interpreted by lower tiers of the security fabric to create corresponding security policies for the IoT device.

At block 403, PEBs created by the analyzing tier may be retrieved by the adapting tier of the security fabric. In another example, the PEBs of IoT devices may be pushed to the adapting tier through a secure tunnel. The PEBs received from the analyzing tier may be stored locally at a local database of the adapting tier.

At block 404, the adapting tier, which may be a SIEM device/service, collects environment information of a private network. Hardware/software configurations of network devices of the private network may be collected by an inventory server and network security policies of the private network may be collected from the executing tier. The adapting tier of the security fabric may have a full view of the private network by correlating the environment information.

At block 405, the adapting tier may generate modified PEBs by tailoring the characteristics defined in the PEBs retrieved from the analyzing tier in accordance with the local network environment information. For example, a PEB of an IoT device may define multiple services that can are provided by an IoT device and multiple remote or local network resources that the IoT device may access. The adapting tier may disable or restrict the services or network resources that are to be used by the IoT device at local network if the services belong to the mandatory class of the PEB.

At block 406, the executing tier retrieves the modified PEBs from adapting tier or retrieves the PEBs from the adapting tier. In one example, the PEBs or modified PEBs may be retrieved or pushed to the executing tier periodically and the baselines may be stored at a local database. In another example, when a new IoT device is connected to a network security appliance of the executing tier, the PEB or modified PEB of the new IoT device may be retrieved by the executing tier from an upper tier.

At block 407, the executing tier creates network policies for controlling network traffic and activities of IoT devices based on the PEBs or modified PEBs of the IoT devices. The executing tier may interpret the scripts in the PEBs and generate corresponding network security policies to implement managements defined in the PEBs the IoT devices. For example, network communication protocols, port numbers, network services and network applications that are defined by the PEBs may be allowed by the network security policies and others communications not in the PEBs of IoT devices may be blocked.

At block 408, executing tier intercepts network traffic of the IoT devices and manages the network traffic and activities of the IoT devices in accordance with corresponding network security policies. Network traffic or activities of the IoT devices that are in compliance with the security policies may be allowed and other traffic and activities may be blocked by the network security appliances. For example, an IoT device of a private network is limited to access the designated servers while any other network traffic is blocked by a firewall based on a PEB. When the IoT device is slaved and launches DDoS attacks to a third party server, the traffic of the DDoS attack will be detected and blocked by the firewall.

Figure 5:
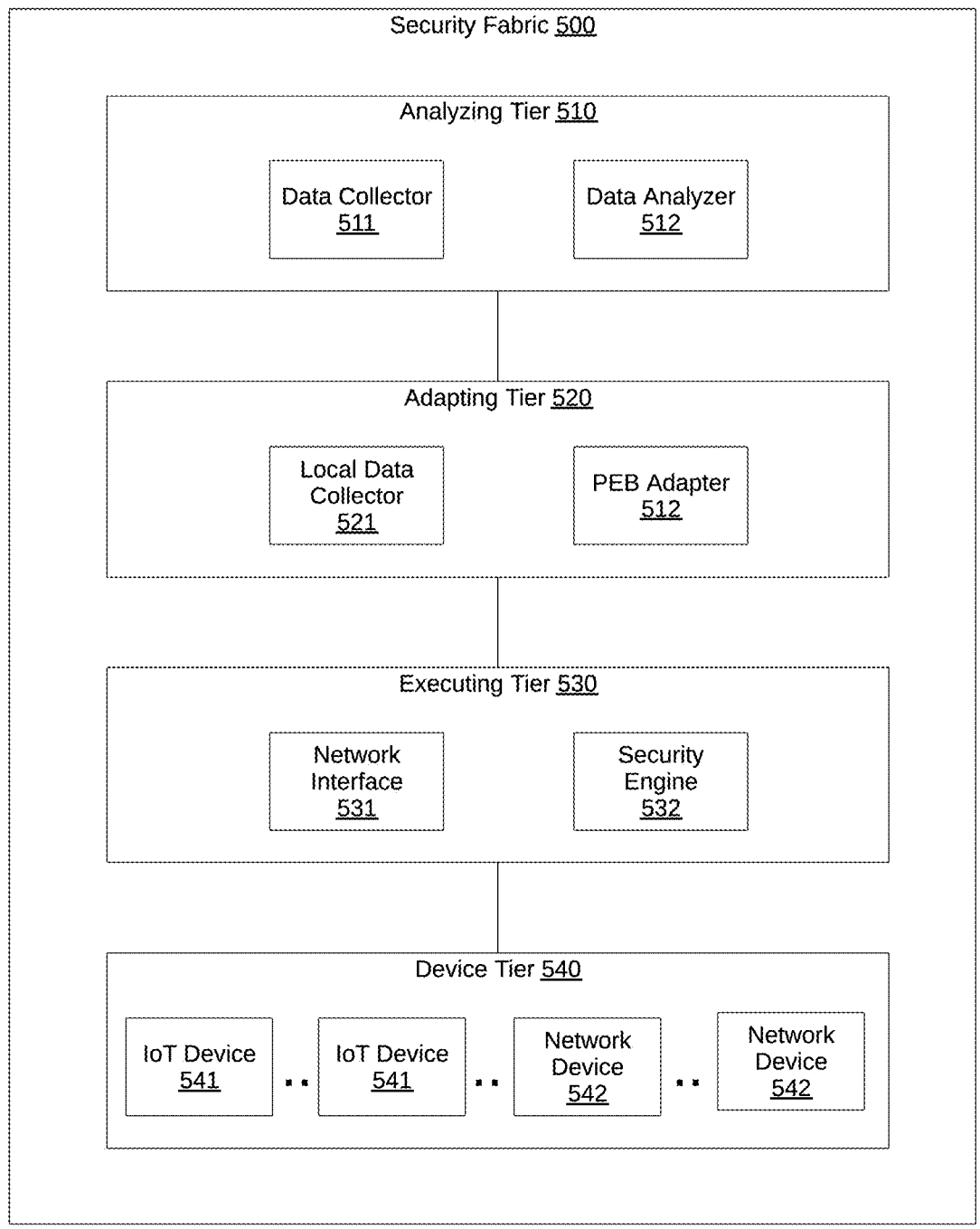
FIG. 5 illustrates exemplary functional units of a security fabric with multiple tiers of services in accordance with an embodiment of the present invention.

FIG. 5 illustrates exemplary functional units of a security fabric with multiple tiers of services in accordance with an embodiment of the present invention. In this example, a security fabric 500 comprises an analyzing tier 510, an adapting tier 520, an executing tier 530 and a device tier 540. Each of the tiers can be connected through a network, such as local area network (LAN), wireless LAN (WLAN), wide area network (WAN) or the Internet.

Analyzing tier 510 may be public cloud-based or private cloud-based service that can be accessed by multiple subscribers and provide IoT device security analyzing service to the subscribers. Analyzing tier 510 may comprises a data collector 511 that is used for collecting information of IoT devices and other network devices from multiple data sources, such as adapting tier 520, executing tier 530, IoT device manufacturers or public available sources. The data sources may be network security appliances that are capable of capturing network traffic transmitting to/from the IoT devices. A data analyzer 512 is used for analyzing the characteristics of IoT devices from data gathered by data collector 511. A PEB of a type of IoT device may be abstracted by data analyzer 512 from the traffic logs or samples of the IoT devices of the same type through pattern recognition, statistical analysis or machine learning. A script of the characteristics of the IoT device may be generated as a PEB that may be interpreted by other tiers of the security fabric 500. The PEB may describe the generic network characteristics, such as communication protocols, port numbers, locations, authentications, local or remote services and applications that are generally used by the IoT device. PEB may also include software/hardware configuration of the IoT device. For a complex IoT device that include multiple basic IoT devices, the PEB thereof may include PEBs of the multiple basic IoT devices as well as other business operations or models of the complex IoT device.

Adapting tier 520 may include a local data collector 521 that is used for collecting and analyzing information of private networks to provide full views of the private networks to network administrators. The data collected by local data collector 521 may be submitted to data collector 511 of analyzing tier 510. In the present example, adapting tier 520 may also include a PEB adapter 522 that is used for retrieving PEBs of IoT devices from analyzing tier 510 and tailoring the PEBs to accommodate local network security policies of private networks. As PEBs retrieved from analyzing tier 510 include generic characteristics of IoT devices that are abstracted from multiple data sources, it may be incompatible with local network requirements. For example, FTP, FTPS, HTTP and HTTPS access to an IoT device are included in a PEB of the IoT device, but the unsafe FTP and HTTP access to internal devices of a private network may be not allowed based on the network security policy of the private network. PEB adapter 522 may remove the FTP and HTTP access from the PEB of the IoT device and create a modified PEB for the private network in order that the modified PEB is in compatible with local security policies.

Executing tier 530 may be one or more network security appliances and each of the network security appliances may comprise a network interface 531 and a security engine 532. Security engine 532 is used for retrieving PEBs or modified PEBs from upper tiers of security fabric 500 and creating network security policies based on the PEBs. The scripts of PEBs may be interpreted to corresponding security policies of local security appliance. Network interface 531 is connected to device tier 540 that comprises multiple IoT devices 541 and other network devices 542 of a private network. Network traffic of IoT devices 541 and other network devices 542 is intercepted at network interface 531 and checked by security engine 532 based on the network security policies that are created in accordance with the PEBs. Actions defined in the security policies may be taken to the network traffic or activities of IoT devices 541 and other network devices 542. For example, the network traffic or activities may be blocked, allowed, logged or deep scanned as defined in the security policies. The operations of policy-based network security appliance are well known to those skilled in the art and further description thereof is omitted.

III. General Computing Device

Figure 6:
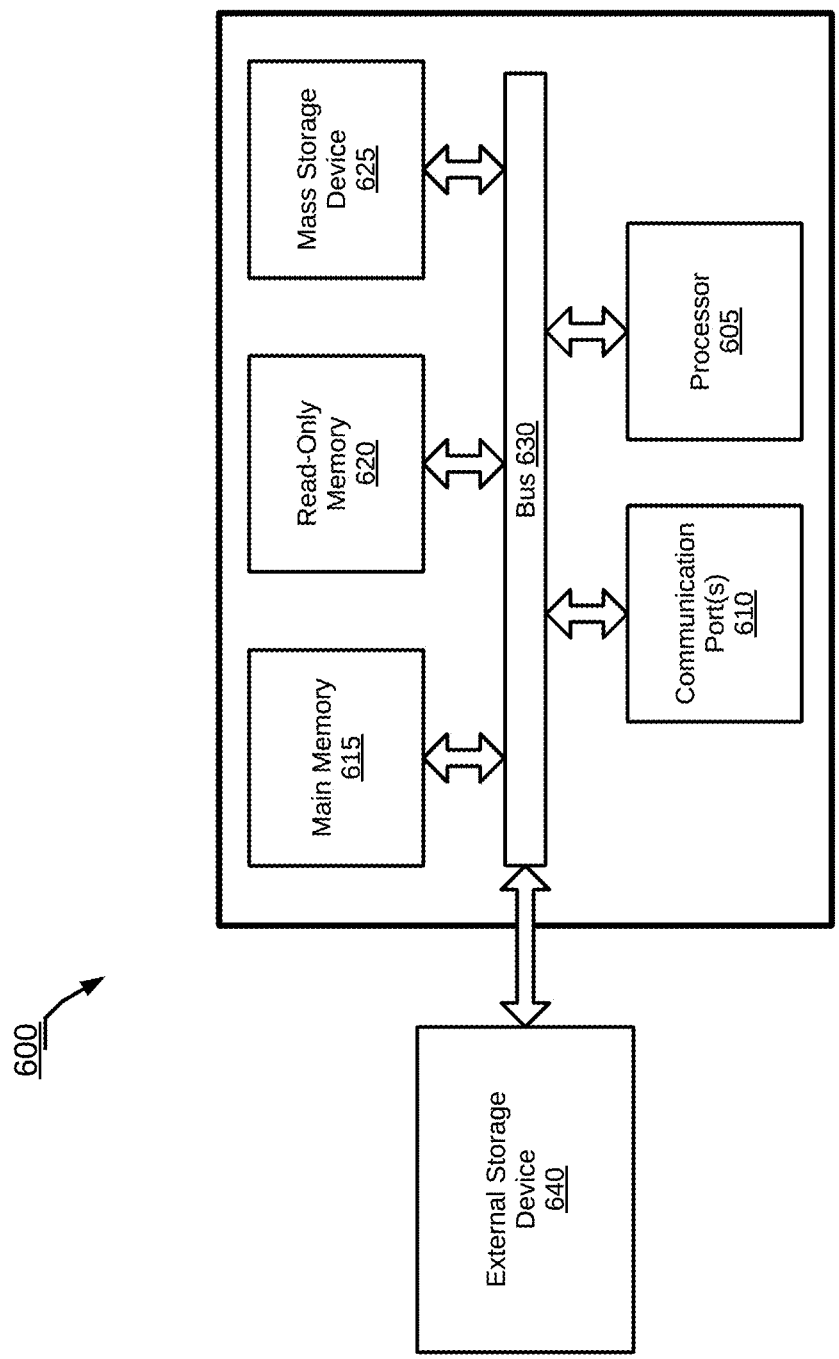
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of a network appliance, a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A cloud-based network security system on a data communication network accessed by a plurality of subscribers from a plurality of private networks for automatically customizing management for variations in IoT (Internet of Things) devices, comprising:
   an analyzing tier of the network security system, communicatively coupled to resources over the data communication network, to generate generic PEBs (profiled element baselines) for IoT devices of different types, wherein the generic PEBs each have a rigid class of policies that are mandatory for implementation and a discretionary class of policies that are optional for implementation;
   an adapting tier of the network security system, communicatively coupled to the analyzing tier and to the private networks over the data communication network, to collect data from IoT devices on a specific private network of the plurality of private networks, wherein the adapting tier retrieves specific PEBs from the analyzing tier based on the collected data and tailors the specific PEBs according to the discretionary class of policies based on local conditions; and
   an executing tier of the network security system, communicatively coupled to the adapting tier and to the specific private network, to interpret the specific PEBs and create local network security policies for controlling network traffic of the IoT devices of the private network to comply with the one or more security policies.

2. The network security system of claim 1, wherein the at least one class comprises a smart sensor class.

3. The network security system of claim 2, wherein the smart sensor class comprises at least one of a heating sensor, alighting sensor, a location sensor, a positioning sensor, a pressure sensor and a motion sensor.

4. The network security system of claim 2, wherein a complex appliance class comprises at least one of a smart office, a smart house and a smart building.

5. The network security system of claim 1, wherein the analyzing tier receives a request from the executive tier responsive to a new IoT device discovered on the specific private network.

6. The network security system of claim 5, wherein the new IoT device is controlled by an updated security policy without manual configuration.

7. The network security system of claim 1, wherein the adapting tier is located remote from the specific private network.

8. The network security system of claim 1, wherein the adapting tier is located on the specific private network.

9. The network security system of claim 1, wherein the adapting tier modifies one of the specific PEBs to disable unsafe HTTP access.

10. The network security system of claim 1, wherein the executing tier creates the local network security policies to allow a communication protocol or a port number blocked by the executing tier.

11. A computer-implemented method in a cloud-based network security system on a data communication network accessed by a plurality of subscribers from a plurality of private networks for automatically customizing management for variations in IoT (Internet of Things) devices, the method comprising:
   generating, by an analyzing tier of the network security system, generic PEBs (profiled element baselines) for IoT devices of different types, wherein the generic PEBs each have a rigid class of policies that are mandatory for implementation and a discretionary class of policies that are optional for implementation;
   collecting, by an adapting tier of the network security system, data from IoT devices on a specific private network of the plurality of private networks
   retrieving, by the adapting tier of the network security system, specific PEBs from the analyzing tier based on the collected data and tailors the specific PEBs according to the discretionary class of policies based on local conditions;
   interpreting, by an executing tier of the network security system, the specific PEBs to create local network security policies to control network traffic of the IoT devices of the private network to comply with the one or more security policies; and
   controlling network traffic of the IoT devices of the private network to comply with the one or more security policies.

12. The method of claim 11, wherein the at least one class comprises a smart sensor class.

13. The method of claim 12, wherein the smart sensor class comprises at least one of a heating sensor, alighting sensor, a location sensor, a positioning sensor, a pressure sensor and a motion sensor.

14. The method of claim 12, wherein a complex appliance class comprises at least one of a smart office, a smart house and a smart building.

15. The network security system of claim 1, wherein the analyzing tier receives a request from the executive tier responsive to a new IoT device discovered on the specific private network.

16. The method of claim 15, wherein the new IoT device is controlled by an updated security policy without manual configuration.

17. The method of claim 11, wherein the adapting tier is located remote from the specific private network.

18. The method of claim 11, wherein the adapting tier is located on the specific private network.

19. The method of claim 11, wherein the adapting tier modifies one of the specific PEBs to disable unsafe HTTP access.

20. A non-transitory computer-readable media for storing source code that, when executed by a processor, performs a computer-implemented method in a cloud-based network security system on a data communication network accessed by a plurality of subscribers from a plurality of private networks for automatically customizing management for variations in IoT (Internet of Things) devices, the method comprising:
   generating, by an analyzing tier of the network security system, generic PEBs (profiled element baselines) for IoT devices of different types, wherein the generic PEBs each have a rigid class of policies that are mandatory for implementation and a discretionary class of policies that are optional for implementation;
   collecting, by an adapting tier of the network security system, data from IoT devices on a specific private network of the plurality of private networks
   retrieving, by the adapting tier of the network security system, specific PEBs from the analyzing tier based on the collected data and tailors the specific PEBs according to the discretionary class of policies based on local conditions;

interpreting, by an executing tier of the network security system, the specific PEBs to create local network security policies to control network traffic of the IoT devices of the private network to comply with the one or more security policies; and controlling network traffic of the IoT devices of the private network to comply with the one or more security policies.

\* \* \* \* \*